Patented Aug. 10, 1948

2,446,799

UNITED STATES PATENT OFFICE 2,446,799

ADSORBENT REFINING METHOD

Charles C. Winding, Ithaca, N. Y., assignor to Tide Water Associated Oil Company, Bayonne, N. J., a corporation of Delaware No Drawing. Application March 24, 1945, Serial No. 584,739

8 Claims. (Cl. 196—147)

The instant invention relates to the refining of oils and other fluids, and more particularly to a method for decolorizing petroleum lubricating oils with use of a special form of alumina. The invention also embraces an alumina adsorbent composition of unique character and method for producing the same.

In one method for the decolorization of lubricating oils, the oil to be decolorized is agitated with a finely divided solid adsorbent material at elevated temperature for a suitable period, followed by separation of the decolorized oil from the spent adsorbent mass. This procedure, known as the "contact" method for decolorizing oils, requires an active adsorbent in finely divided form which will not unduly affect desired properties of the lubricating oils so treated. Certain magnesium silicates and treated clays have been proposed as contact adsorbents for use in the decolorization of oils by this method, the better known of which are "Magnesol" and "Filtrol." Likewise, bauxite and certain other forms of alumina are mentioned in the art as having adsorbent power, but none of these aluminas, so far as I am aware, exhibit the high oil-decolorizing power and other desired properties of the stated better known silicates and clays when employed in the described contact decolorizing procedure.

The alumina adsorbent composition of the present invention is characterized by superior adsorbent power as compared with aluminum-containing materials with which I am familiar, particularly as regards oil-decolorizing ability. While general utility is contemplated in the various arts requiring use of adsorbents, the product of this invention has particular usefulness in the refining of petroleum fractions in view of its demonstrated activity as a decolorizing agent for oils. Said composition, when employed as an adsorbent in the contact decolorization method of refining lubricating oils, surpasses in decolorizing power the commercially used silicate and treated clay adsorbents referred to hereinabove; and the invention has as a primary object the use of the said alumina adsorbent composition in such methods.

As distinguished from the naturally occurring alumina materials, such as bauxite, the adsorbent of this invention is synthetically prepared. The method of its preparation comprises a controlled precipitation step involving the precipitation of a hydrated alumina of particular form by treatment of a suitable aluminum compound in alkaline solution with a suitable aluminum salt in solution. The proper choice of reactants and control of reaction conditions in this step, as described below, are important factors in obtaining final adsorbent alumina products of superior activity and other desired properties. More particularly, two solutions are made up, the first containing an alkali metal aluminate, for example, sodium aluminate, and the second containing an aluminum salt of a strong acid, for instance, aluminum sulfate. The concentrations of these solutions may vary somewhat, but the aluminate solution should be of high enough concentration as to furnish sufficient hydroxyl ions to precipitate the aluminum ions from the aluminum salt solution. Good results are obtained when using solutions of such relative concentrations that the ratio of equivalents of alkali metal hydroxide in the aluminate solution to equivalents of aluminum salt in the aluminum salt solution ranges between about 0.8 and about 1.3, and in which the respective concentrations of the reactant solutions are comparatively high. For example, satisfactory results are had using aluminum sulfate solutions of about 0.3 molal concentration, and sodium aluminate solutions in which the total equivalence of sodium varies between about 1.3 and about 3.5 molal.

Aluminates which do not give stable solutions are preferred, since it has been found that use of these grades of aluminates in the precipitation step results in more active final adsorbent products than the more stable aluminates.

After the solutions are prepared in the above-stated manner, they are preferably heated before mixing for obtainment of final adsorbent products of optimum oil-decolorizing power. Likewise, best results are obtained by removing any undissolved material from the aluminate solution prior to mixing with the aluminum salt solution. The hot aluminum salt solution is then mixed with the hot aluminate solution with agitation, resulting in precipitation of a finely divided alumina hydrate.

After filtering, the alumina hydrate, produced as above-described, is calcined to remove water and produce the highly active alumina adsorbent. Calcination conditions, including time and temperature of heating, should be so controlled that all of the water is not removed, since completely anhydrous alumina possesses little or no adsorbent activity. Products of good activity result when the calcination temperature used varies from about 115° C. to about 500° C. At the higher temperatures, correspondingly shorter heating periods may be employed. Best results, as regards activity of the calcined product, are obtained by calcining at relatively high temperatures, say about 400° C., for short periods. Calcined alumina hydrates of this invention, containing from about 5% to about 30% water, possess satisfactorily high adsorbent activity as measured by their ability to decolorize oils by the described contact procedure. Presumably, this water is in the combined state.

One important feature of this invention resides in the fact that the adsorbent is produced directly in a finely divided form satisfactory for contact decolorizing use. No grinding or other additional steps to reduce the product to required particle size is necessary.

The peculiar structural nature of these hydrated alumina adsorbents, thought to be responsible at least in part for their high adsorbent power as compared with other aluminas, is not entirely understood. X-ray studies of these products indicate that their atomic structure differs considerably from anhydrous gamma alumina; but they exhibit an X-ray diffraction pattern similar to that of the monohydrate Boehmite.

By way of specific example, illustrating the preferred practice, 90 grams of a commercial grade of sodium aluminate were added to 400 c. c. of water and, while agitating, the slurry was heated to 95° C. A second solution was prepared by dissolving 90 grams, of $Al_2(SO_4)_3.18H_2O$ in 500 c.c. of water and heating to 95° C. After filtering the aluminate solution to remove undissolved material, the hot aluminum sulfate solution was slowly added thereto with agitation. The resulting mass, comprising a finely divided precipitate of hydrated alumina, was filtered and the hydrated alumina was transferred to a muffle furnace where it was heated at a temperature of about 400° C. for 3 hours. After this calcining, the water content of the hydrated alumina had been reduced to 30.5% (total water, i. e., weight loss on ignition).

The resulting calcined adsorbent product exhibited unusually high oil-decolorizing power, as will be apparent from the following tabulated data resulting from use of the same, and other adsorbents designated, in a contact method for decolorizing a lubricating oil.

The oil used for test purposes was an undewaxed Pennsylvania cylinder stock of 26.1 gravity, 50° F. pour point, 550° F. flash (closed cup) and 147 seconds Saybolt viscosity at 210° F. Color determinations were made by the optical density (O. D.) method of Ferris and McIlvain (Industrial & Engineering Chemistry, Analytical edition 6, 23 (1934)). Directions, as given in the reference mentioned, were followed exactly except that a Bausch and Lomb monochromatic green filter was used as a source of monochromatic light. By this method, the initial color of the test oil prior to any decolorizing treatment was 2650 O. D. lower O. D. numbers represent improvement in color.

In the test, a measured quantity of oil as aforesaid was agitated in a substantially closed vessel for a predetermined period of time in contact with a measured quantity of adsorbent or decolorizing material at a set temperature. The optical density of the treated oil then was compared with that of the original stock in order to obtain a measure of the value or effectiveness of the decolorizing agent. The data set forth below were obtained with test conditions standardized at 300 grams of cylinder stock, 40 grams of adsorbent or decolorizing agent, treating temperature of 400° F. and treating time of 20 minutes. Under these treating conditions and for purposes of the test in question, a treated oil sample having a color corresponding to 1250 O. D. is evidence of very, very slight decolorizing power or activity in the adsorbent agent; while a positively or highly active agent would improve the oil to the extent represented by a change from initial 2650 O. D. to treated oil O. D. of about 300 to about 500.

| Adsorbent | Color of treated oil O. D. |
|---|---|
| Hydrated Alumina of above example | 282 |
| Anhydrous $Al_2O_3$ | 810 |
| Ground Bauxite (Dried @ 400° C.—3½ hrs.) | 1340 |
| Acid Treated Clay (Contact adsorbent grade) | 900 |
| Magnesium Silicate (Contact adsorbent grade) | 470 |

The effectiveness of the method of the present invention in oil refining, using the described hydrated alumina adsorbents, is apparent from the tabulated data which show an unusual lowering of the optical density to 282 which corresponds to an extremely high degree of decolorization of the oil as compared to the other forms of alumina and other adsorbents tested.

After the adsorbent alumina of the invention has become spent in the decolorization of oils, its adsorbent power may be revivified by burning, for example, at about 1050° F. for a suitable period, or by treatment with solvents in known manner.

The adsorbent material of the invention, while of primary interest as a contact decolorant or adsorbent, is also adaptable for use in percolant decolorizing methods comprising filtering the oil to be decolorized through a deep bed of the alumina hydrate which has been pelleted and the pellets ground to proper percolant adsorbent size. Its percolant decolorizing activity is high as compared to percolant grade fuller's earth now being used in large quantities for the decolorization of lubricating oils.

I claim:

1. A method for refining oil comprising contacting said oil with an active hydrated alumina adsorbent composition prepared by reacting under controlled conditions an alkaline aluminate in solution with an aluminum salt to produce a finely divided hydrated alumina and removing part of the water of hydration of the latter.

2. A method for decolorizing oil comprising agitating a mixture of said oil with a hydrated alumina adsorbent at elevated temperature and separating the spent adsorbent and decolorized oil, said adsorbent having been prepared by reacting in aqueous solution an alkali metal aluminate and an aluminum salt to produce a hydrated alumina having desired properties and heating said hydrated alumina under conditions effective to remove a portion of its water of hydration.

3. A method for refining oils comprising contacting said oil with a hydrated alumina of relatively high adsorbent activity, said hydrated alumina having been prepared by reacting an alkaline aluminate with an aluminum salt to precipitate hydrated alumina in finely divided form and calcining the precipitated material to remove a portion of its water of hydration.

4. A method for decolorizing mineral lubricating oils comprising agitating the oil to be decolorized with an active hydrated aluminum oxide composition prepared by controlled precipitation of aluminum oxide in finely divided condition by addition of a hot aqueous solution of aluminum sulfate in relatively low concentration to a hot aqueous solution of sodium aluminate containing hydroxyl ions equivalent to the aluminum of the aluminum sulfate, and calcining the resulting hydrated alumina to partially remove its water of hydration.

5. A method for refining oil comprising contacting said oil with an active hydrated alumina adsorbent composition, said composition having been prepared by reacting an alkaline aluminate with an aluminum salt to precipitate hydrated alumina in finely divided form and calcining the precipitated material to remove a portion of its water of hydration.

6. A method for decolorizing mineral lubricating oils comprising agitating the oil to be decolorized with an active hydrated aluminum oxide composition prepared by controlled precipitation of hydrated alumina in finely divided condition by addition of a hot aqueous solution of aluminum sulfate in relatively low concentration to a hot aqueous solution of sodium aluminate containing hydroxyl ions equivalent to the aluminum of the aluminum sulfate, and calcining the precipitated hydrated alumina until the water of hydration thereof is about 5 to 30%.

7. In the process for decolorizing of oils wherein an oil to be decolorized is contacted with a hydrated alumina adsorbent obtained as a precipitate by reaction of an alkaline aluminate in solution with an aluminum salt, the method of improving the decolorizing efficiency of said process which comprises removing a portion of the water of hydration from said adsorbent prior to use thereof for decolorizing of oil in the aforesaid process.

8. In a process for decolorizing oils wherein an oil to be decolorized is contacted with a hydrated alumina adsorbent, said adsorbent having been obtained in finely divided form as a precipitate by reaction between an aqueous solution of aluminum sulfate with an aqueous solution of sodium aluminate containing hydroxyl ions at least equivalent to the aluminum of the aluminum sulfate, the method of improving the decolorizing efficiency of said process which comprises calcining said adsorbent to remove only a portion of water of hydration therefrom prior to use of said adsorbent for decolorizing of oil in the aforesaid process.

CHARLES C. WINDING.

REFERENCES CITED

The following references are of record in the file of this patent:

UNITED STATES PATENTS

| Number | Name | Date |
|---|---|---|
| 1,822,848 | Barclay | Sept. 8, 1931 |
| 1,935,178 | Connolly | Nov. 14, 1933 |
| 1,958,710 | Moyer | May 15, 1934 |
| 2,053,208 | Curtis | Sept. 1, 1936 |
| 2,211,489 | Bierce | Aug. 13, 1940 |
| 2,294,779 | Hyman | Sept. 1, 1942 |
| 2,384,315 | Kuhl | Sept. 4, 1945 |
| 2,397,085 | Boedeker et al. | Mar. 26, 1946 |
| 2,403,088 | Laing | July 2, 1946 |
| 2,406,420 | Weiser et al. | Aug. 27, 1946 |

FOREIGN PATENTS

| Number | Country | Date |
|---|---|---|
| 424,734 | Great Britain | Feb. 27, 1935 |